(12) United States Patent
Obinna

(10) Patent No.: US 10,232,956 B2
(45) Date of Patent: Mar. 19, 2019

(54) AEROBRIDGE PROVIDING MULTIPLE ACCESS POINTS TO AIRCRAFT VEHICLE

(71) Applicant: SkyGenex Inc., Daytona Beach, FL (US)

(72) Inventor: Dynamite K. Obinna, Daytona Beach, FL (US)

(73) Assignee: SkyGenex, Inc., Daytona Beach, FL (US)

(*) Notice: Subject to any disclaimer, the term of this patent is extended or adjusted under 35 U.S.C. 154(b) by 0 days.

(21) Appl. No.: 16/116,022

(22) Filed: Aug. 29, 2018

(65) Prior Publication Data

US 2019/0009927 A1    Jan. 10, 2019

Related U.S. Application Data

(63) Continuation of application No. PCT/US2017/020933, filed on Mar. 6, 2017.

(60) Provisional application No. 62/303,693, filed on Mar. 4, 2016.

(51) Int. Cl.
*B64F 1/305* (2006.01)
(52) U.S. Cl.
CPC .................... *B64F 1/305* (2013.01)
(58) Field of Classification Search
CPC .......................................... B64F 1/305
USPC ........................................ 14/71.5
See application file for complete search history.

(56) References Cited

U.S. PATENT DOCUMENTS

| 3,524,207 | A | 8/1970 | Giarretto |
| 3,538,529 | A | 11/1970 | Breier |
| 3,722,017 | A | 3/1973 | Gacs et al. |
| 3,728,754 | A | 4/1973 | Lodjic |
| 6,487,743 | B1 | 12/2002 | Nicoletti |

(Continued)

FOREIGN PATENT DOCUMENTS

| DE | 19717386 A1 | 10/1998 |
| WO | 98/47764 A2 | 10/1998 |
| WO | 00/09395 A1 | 2/2000 |

OTHER PUBLICATIONS

International Preliminary Report on Patentability for PCT application No. PCT/US2017/020933, with an international filing date of Mar. 6, 2017.

(Continued)

*Primary Examiner* — Raymond W Addie
(74) *Attorney, Agent, or Firm* — Nicholas Pfeifer; Smith & Hopen, P.A.

(57) ABSTRACT

An aerobridge and dual method of operation thereof that significantly reduces the turnaround time (time between routes) of an aircraft vehicle at a terminal gate. The aerobridge includes a cab rotunda, cab, and a bridge formed of a plurality of passageways and/or ramps. The passageways/ramps are telescopically received in a proximal-most passageway/ramp in a retracted position and are telescopically extended along the aircraft vehicle in an extended position. The aerobridge may further include a plurality of height-adjustable and/or retractable support mechanisms disposed in underlying relation to the bridge. The aerobridge can be mated with an aircraft vehicle using a shoot-out method or a swing method, thus accommodating different airports' configurations and limitations.

21 Claims, 11 Drawing Sheets

(56) References Cited

U.S. PATENT DOCUMENTS

| | | | |
|---|---|---|---|
| 6,496,996 B1 * | 12/2002 | Worpenberg | B64F 1/3055 14/71.5 |
| 6,526,615 B1 | 3/2003 | Hutton et al. | |
| 6,684,443 B2 | 2/2004 | Thomas et al. | |
| 6,954,959 B2 * | 10/2005 | Hutton | B64F 1/305 14/71.3 |
| 7,603,736 B2 * | 10/2009 | Hutton | B64F 1/3055 14/71.5 |
| 8,863,341 B1 | 10/2014 | Keith et al. | |
| 2004/0148716 A1 * | 8/2004 | Hutton | B64F 1/3055 14/71.5 |
| 2007/0084001 A1 * | 4/2007 | Anderberg | B64F 1/3055 14/71.5 |
| 2015/0353207 A1 * | 12/2015 | Cox | B64F 1/00 14/71.1 |

OTHER PUBLICATIONS

International Search Report for PCT application No. PCT/US2017/020933, with an international filing date of Mar. 6, 2017, and dated May 26, 2017.

\* cited by examiner

AEROBRIDGE PROVIDING MULTIPLE ACCESS POINTS TO AIRCRAFT VEHICLE

CROSS-REFERENCE TO RELATED APPLICATIONS

This nonprovisional application is a continuation of and claims priority to PCT application No. PCT/US17/20933, filed on Mar. 6, 2017, which claims benefit of U.S. Provisional Patent Application No. 62/303,693, filed Mar. 4, 2016, by the same inventor, the entirety of which is incorporated herein by reference.

BACKGROUND OF THE INVENTION

1. Field of the Invention

This invention relates, generally, to mechanisms for boarding an aircraft vehicle. More specifically, it relates to jetways or other aircraft passenger-boarding bridges (PBBs).

2. Brief Description of the Prior Art

PBBs were fabricated to eliminate the need for climbing stairs and to protect passengers from extreme temperatures, noise, and unpleasant odors associated with ramp areas. Generally, PBBs are telescopic structures that have one end pivoted on the terminal building. On the opposite end of a conventional PBB is a vertically adjustable aircraft cab positioned to service a single door on the side of an aircraft (see FIG. 1A). However, with a growing need in making air travel faster, aircraft manufactures have continually increased aircrafts' carrying capacities. The AIRBUS A380, for example, can accommodate up to 853 passengers in an all-economy-class configuration.

Using conventional PBBs, it takes a remarkable amount of time to board a large number of passengers, causing departure delays and forcing passengers to arrive at the airport terminal/gate at an earlier time than otherwise would be necessary. Although the deplaning process is reverse, it can also take a significant amount of time to exit the aircraft, as passengers are forced to line up on their way out through a single door. Furthermore, the aircraft cannot be cleaned or maintained while passengers are egressing.

Another problem that conventional PBBs present is the increasing demand of airlines and airport managers to achieve shorter and shorter turnaround-times. With the current turnaround-time being rather lengthy, at least in part due to the lengthy boarding and deplaning processes, airlines can only fly an aircraft on a very limited number of times or routes per day. As such, flight planning for an airline is not as resourceful as it otherwise could be. This, consequently, leads to an inefficient utilization of airplanes, which in turn, reflects in extreme negative impact on the amount of revenue that airlines can generate, thus potentially causing airlines to charge higher prices to consumers.

Airlines have explored various ways to reduce turnaround times. One attempt is through selective loading by zones. Although loading by zones helps reduce boarding time, it cannot be optimized beyond levels achieved through the use of a single door, given that turnaround times are constrained by the physical limitation of how quickly passengers can exit the aircraft through a single door. A further attempt to reduce the problem associated with the conventional art is the use of more than one door for boarding and deplaning passengers. However, as shown in FIG. 1B, due to the wing configuration of aircrafts, coupled with the differing positions of access doors in the sides of airplanes, more than one conventional PBB must be used to simultaneously service multiple doors. In addition, most commercial planes have additional access doors located directly above the wing roots, which are entirely inaccessible by such conventional methods and PBBs.

Turning now to issues of parking an aircraft at the terminal gate, there are the two primary methods to allow passenger ingress and egress between terminal buildings and the aircraft: parallel parking and nosed-in parking. With parallel parking, the aircraft arrives to and leaves its parked position using its own power. With nosed-in parking, the aircraft arrives to and leaves its parked position using a separate tow tractor. Further, parallel parking requires considerable turning and maneuvering room, which necessitates a significant amount of terminal space. Given this disadvantage of parallel parking, most airports implement nosed-in parking. With nosed-in parking, however, conventional PBBs are only able to serve the forward doors of aircrafts, forcing passengers to board and disembark the aircraft through the front door, thus increasing aircraft turnaround time. Additionally, not all aircrafts can park at the same position at terminal gates.

Attempts have been made to provide aerobridges that attempt to overcome at least one the foregoing drawbacks; in particular, attempts have been made to service multiple doors on an aircraft. FIG. 1B is an example of an elongated, over-the-wing passageway that is used to provide multiple-door servicing to an aircraft and is sustained pivotally on a stationary support column on one end with a movable support column at the opposite end. However, as a result the aircraft's wing being stuck between two support columns, it is unfeasible for the aircraft to move away from the terminal building, if a power failure occurs when the elongated passageway is in motion. Yet another example of such an aerobridge occurs where multiple jetways are used to service the aircraft doors. Each jetway leads to one aircraft door. While this mechanism might reduce turnaround time to a degree, this mechanism also is very expensive, complex, and inefficient.

Further examples of conventional PBBs will now be discussed herein. U.S. Pat. No. 3,538,529 to Breier describes a loading bridge with an overhead support, which can be swung to mate with the rearward access door of an aircraft, where the overhead support includes telescoping tunnels that are pivoted on a non-movable structure, thus providing the ability to vertically swing the apparatus to access the rearward of an aircraft. However, Breier is clumsy, complex, and expensive to manufacture, particularly difficult in an economy where airlines are challenged with cost decisions.

U.S. Pat. No. 3,722,017 to Gacs et al. teaches an over-the-wing PBB with a main passageway pivotally supported at the end of the terminal building on a track mounted rack driven column. By elevating and depressing the main passageway, the outer end portion, which is slightly arched, extends over-the-wing of the aircraft to service doors aft the wing roots. A disadvantage of this system is that its lateral passageway and the mechanism used for adjusting the passageway adds an enormous weight to the outboard end of the passageway. This makes it difficult to align the bridge with an aircraft rear door in a short amount of time.

U.S. Pat. No. 3,728,754 to Lodjic discloses a vertically adjustable PBB that is connected on one end to the airport terminal on one end, and on the other end to a ramp that can be adjusted vertically between various heights to allow different aircrafts with different doorsills to be accessible by one system. A major shortcoming of Lodjic is that it only compensates for the various doorsills heights on different aircrafts and does not account for the varying horizontal positions of doors along aircrafts.

U.S. Pat. No. 6,487,743 to Nicoletti describes a vertically adjustable PBB with three rooms arranged to form a single passageway by which passengers can access several doors on an aircraft through the first and third slidable rooms, thus permitting passengers to select different entry routes into the plane and in turn reducing airplane turnaround time. Considering that various aircrafts have different wing configurations, however, it is a disadvantage of this system that it can only be used to service aircrafts that have specific wing configurations that would accommodate this awkward structure.

U.S. Pat. No. 6,684,443 to Thomas et al. teaches a PBB that reduces turnaround time by allowing an aircraft to emplane and deplane from both the right side and the left side of an aircraft simultaneously. This is achieved by the use of an apparatus having a passageway extending from the terminal building, and having two arms extending from the passageway, one arm serving the door on the left side of aircraft, and the other arm servicing the door on the right side of an aircraft. This system allows passengers to board and disembark an aircraft from opposite sides of the aircraft simultaneously. While Thomas provides airlines the ability to quickly board and deplane passengers simultaneously from both sides of an aircraft, the additional complexity of aligning the bridge increases aircraft turnaround time. Also, the U-shape design of Thomas poses a substantial safety risk during situations requiring rapid detachment of the aircraft as in the case of fire on the ramp or in the aircraft at the terminal. Further, Thomas can only serve aircrafts parked nosed-in at the terminal, which can be disadvantageous at airports where ramp space is limited.

U.S. Pat. No. 6,526,615 to Hutton et al. discloses a flexible over-the-wing apparatus for moving passengers between an airport terminal building and the rearward doorway located after the wing roots of an airplane. This is accomplished through a flexible passageway pivotally coupled to the terminal building and a conventional telescopic PBB for servicing a front door of the same aircraft. The flexible passageway provides a cabin carried at an outboard end of a telescopic corridor to mate with the rear doorway of an aircraft, providing an open corridor between the rear doorway and the terminal building through which passengers can deplane.

Among other disadvantages of this PBB, Thomas appears to be designed for the sole purpose of deplaning passengers. Furthermore, the flexible over-the-wing passageway forces passengers to walk a long distance from the rear doorway of an aircraft to the building terminal. It also presents a cost challenge for airports and airline managers due to airports having to install an additional passageway that connects the terminal building to the rearward of airplanes. In addition, the position of the flexible connection above the high point of the wing, which is supported to minimize the inclination of the passageway member floor surface, creates a potential slip and fall hazard to the elderly and disabled passengers.

U.S. Pat. No. 8,863,341 to Keith et al. describes a structure and method for boarding and deplaning an aircraft via a ramp consisting of a flat deck with a front deck edge, a bridge connector assembly driven by a level deck at the front edge, and one floating upper bridge driven by a bridge connector. The bridge connector enables horizontal pivoting movement of the upper floating bridge located adjacent to the level deck. A major disadvantage of Keith is that it is strictly used to serve the first and second doors on an aircraft, and the dual bridge can only be used to access the forward doors on the aircraft.

International Patent Application Publication No. WO2000009395 filed by Kubatzki teaches an over-the-wing PBB consisting of at least one horizontally pivotal extension tunnel with a device on the end for docking to an airplane. However, Kubatzki provides access to only one door at a time. In addition, the extensive length of the cantilever section of Kubatzki's PBB poses a significant weight management factor considering its massive size and length.

International Patent Application Publication No. WO1998047764 also filed by Kubatzki discloses a stationary or movable PBB for rapidly boarding and deplaning passengers on large aircrafts by the use of a single or multi-level telescopic, cantilever bridge that has connecting passageways. The cantilever structure can be adjusted vertically or adjusted by sections. Similarly, additional vertical adjustment can be made by tilting the cantilever passageway upwards or by swinging it out to the side. This system is both awkward and extremely expensive to manufacture. It is a further disadvantage of this system that only one stationary or movable support column carries the entire weight of the cantilever bridge and live loads. As will be discernable to one skilled in the art, having multi-level passageway supported by a single column adds an undesirable amount of weight on the pivot support. Another notable shortcoming of Kubatzki's structure is that the cantilever mates with an aircraft by an upward tilt or swinging motion. Reported cases of fire on the terminal gate are usually a result of the PBB collapsing on the wing of aircrafts, and Kubatzki's structure creates a great potential for such an incident.

U.S. Pat. No. 3,524,207 to Giarrelto teaches an over-the-wing PBB for providing simultaneous access to aircraft entry ways through a singular elongated structure that serves multiple doors along sides of an airplane with two spaced supports column: one that supports the central portion of the elongated passageway, and the other at the end of the elongated passageway. A major disadvantage of Giarrelto is that in the case of a power failure, when the elongated passageway is in motion or when the cantilever units are deploying to mate with an aircraft, it becomes impossible for the aircraft to move away from the terminal building, given that the spaced supports are positioned on the opposite sides of the aircraft wing. A further deficiency of Giarrelto's system is that because the elongated passageway is a fixed length, it can only be used to serve aircrafts within a given horizontal length. In other words, stretched, or very stretched, aircraft models cannot be served using Giarrelto's PBB. Even so, due to the tail configuration of certain aircrafts, this system may not be used to access rearward access doors of certain aircraft models. Also, with improvements in the shape and design of aircraft wings, such as the invention of wingtips devices, the process of serving aircrafts with these wing configurations using Giarrelto's bridge becomes complex and extremely difficult, as the bridge would have to overcome the vertical upward height created by the aircraft's wingtip.

As detailed above, each of the foregoing references leads to one or more of the previously-described problems seen in the conventional art. Accordingly, what is needed is an improved aerobridge that provides multiple access points into an aircraft that has multiple access doors. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved aerobridge is now met by a new, useful, and nonobvious invention.

In an embodiment, the current invention is an aerobridge that provides multiple entry and exit points into and out of a plurality of doors on an aircraft vehicle. The aerobridge includes an extendible bridge that is coupled to a cab assembly (e.g., cab+cab rotunda; coupled to cab rotunda if present) configured to be coupled to a terminal gate and to the aircraft vehicle. The bridge is formed of a plurality of passageways that have a length parallel to a length of the aircraft vehicle when the bridge is in use and at least partially extended. A plurality of access points is disposed within the passageways and aligned with the aircraft vehicle's doors, such that passengers enter/exit the aircraft vehicle through its doors and the access points. A support system is positioned in underlying relation to the bridge for supporting the bridge along its length.

The aerobridge has a retracted position, an extended position, and a plurality of stable positions between the retracted and extended positions. In the retracted position, the passageways are fully retracted into or adjacent to a proximal-most passageway of the bridge. In the extended position, the passageways are fully extended distally along the length of the aircraft vehicle and over a wing root of the aircraft vehicle. In the stable positions between the retracted and extended positions, the passageways are partially extended distally along the length of the aircraft vehicle.

The extendible bridge may be extended and retracted in any suitable way. For example, extension can be performed by the passageways extending telescopically out of the proximal-most passageway, and retraction can be performed by the passageways retracting telescopically into the proximal-most passageways.

The support system may include a proximal drive support column and/or a retractable distal end support. The proximal drive support column is disposed in underlying relation to a proximal portion of the bridge at a position proximal to the aircraft vehicle's wing root. Additionally, the proximal drive support column is vertically adjustable. The retractable distal end support is disposed in underlying relation to a distal portion of the bridge at a position distal to the aircraft vehicle's wing root. Further, the retractable distal end support is vertically retractable into or along the bridge. When the distal end support is present, an end support column housing may be disposed at the distal end of the bridge, such that the distal end support is retractable into the housing and extendible to contact a ground on which the aircraft vehicle is positioned.

The extendible bridge may further include an extendible ramp disposed anywhere along the length of the bridge to provide extensions beyond the passageways. Further, the ramp may be positioned over the aircraft vehicle's wing root between passageways. More specifically, the passageways can include a first passageway being the proximal-most passageway, a second passageway, and a third passageway being a distal-most passageway, where the extendible ramp is disposed between the first and second passageways.

The access points between the bridge and the aircraft vehicle's doors can be accomplished by an open inner side along a substantial entirety of the length of the bridge. In this case, the bridge's top side would be mated to the aircraft vehicle above the aircraft vehicle's doors, and the bridge's bottom side would also be mated to the aircraft vehicle.

In a separate embodiment, the current invention is a method of mating and detaching an aerobridge to and from an aircraft vehicle. This method includes the shoot-out method that will become clearer as this specification continues. Information pertaining to type, height, and characteristics of the aircraft vehicle is retrieved, where the aircraft vehicle is parked at the terminal gate. The aerobridge includes a cab assembly, an extendible bridge formed of a plurality of passageways that are extendible and retractable, and a support system disposed in underlying relation to the bridge for supporting the bridge along its length. The support system includes a proximal drive support column that is vertically adjustable and a retractable distal end support that is retractable into or along the bridge.

The cab assembly is moved to align and mate with a proximal door of the aircraft vehicle. The passageways are extended substantially parallel to a longitudinal extent of the aircraft vehicle. The passageways extend to a distal stop position of the bridge along the aircraft vehicle. The distal end support is extended to contact the ground if the distal stop position of the bridge is determined to be positioned distal to the aircraft vehicle's wing root. This determination is based on the information about the aircraft vehicle being serviced. On the other hand, if the distal stop position is determined to be proximal to the aircraft vehicle's wing root, the distal end support can retract or remain retracted. The passageways are mated to the aircraft vehicle to provide multiple access points through the aircraft vehicle's multiple doors.

In a separate embodiment, the current invention is a method of mating and detaching an aerobridge to and from an aircraft vehicle. This method includes the swing method that will become clearer as this specification continues. The primary difference between the swing method and the shoot-out method is that in the swing method, the passageways are not necessarily extended parallel to the longitudinal extent of the aircraft vehicle. Rather, they are extended at an angle and when extended to the distal stop position, the bridge is swung toward the aircraft vehicle at a predetermined swing angle. The cab assembly is then moved and mated to the front door of the aircraft vehicle. The passageways are then mated to the aircraft vehicle via the swing angle to provide multiple access points through multiple doors on the aircraft vehicle.

In either the shoot-out or swing method, the multiple access points on the bridge are formed of an open inner side along a substantial entirety of the bridge's length. In this case, the bridge's top side would be mated to the aircraft vehicle above the aircraft vehicle's doors, and the bridge's bottom side would also be mated to the aircraft vehicle.

The extendible bridge may be extended and retracted in any suitable way. For example, extension can be performed by the passageways extending telescopically out of the proximal-most passageway, and retraction can be performed by the passageways retracting telescopically into the proximal-most passageways.

To detach the aerobridge from the aircraft vehicle, the distal end support is retracted, the passageways and cab assembly are detached from the aircraft vehicle, the passageways are retracted into a proximal-most passageway, and the aerobridge is moved away from the aircraft vehicle.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
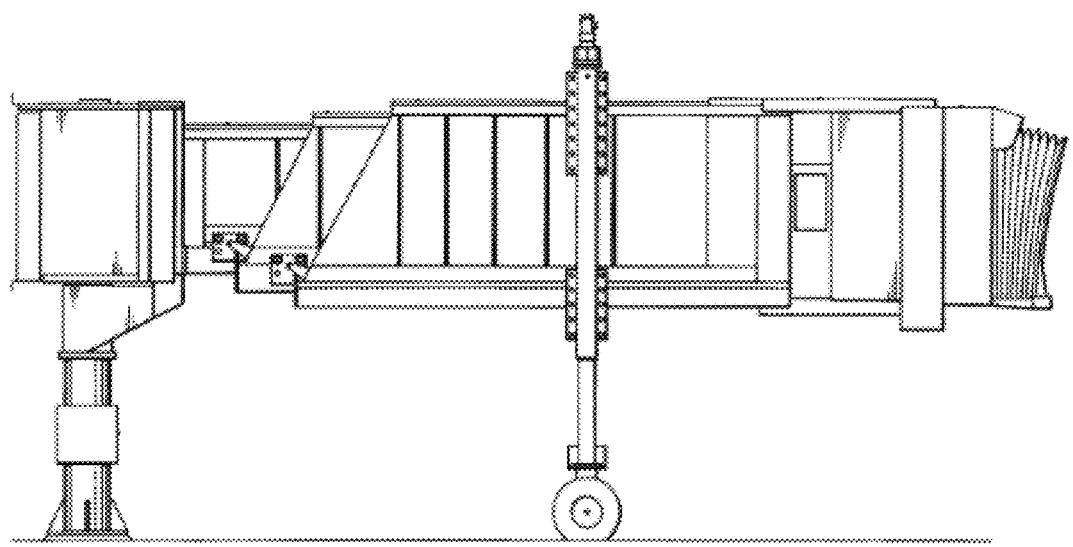
FIG. 1A depicts a typical example of an aerobridge as currently used in airports.
Figure 1B:
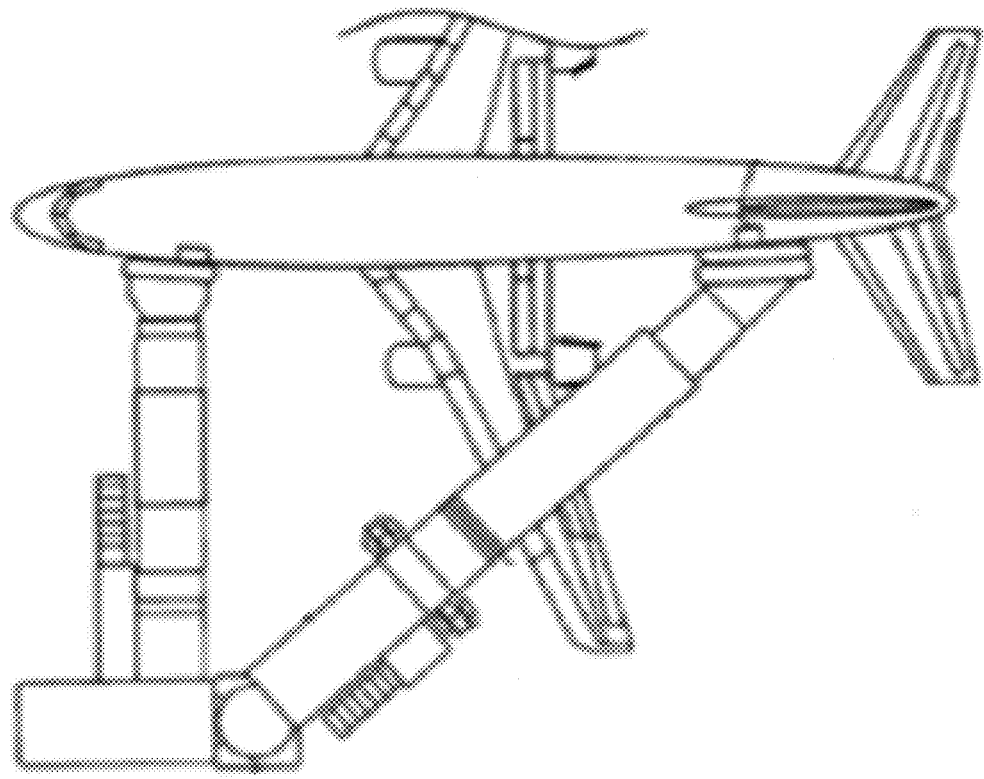
FIG. 1B depicts an example of the conventional art, specifically over-the-wing bridge used to serve the rear doorway of air aircraft. While this method reduces turn-around time to some degree, it is very expensive and is inconvenient for passengers to walk long distances from the rear doorway of the aircraft to the terminal gate.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

In certain embodiments, the current invention is an aerobridge and dual method of operation thereof that significantly reduces the boarding and deplaning times, which in turn, reduces turnaround time (time between routes) of an aircraft vehicle at a terminal gate.

Structure

In certain embodiments, the current invention is an aerobridge that includes a vertically- and horizontally-adjustable cantilevered, open-sided (e.g., U-shaped with one open side) apparatus including a plurality of passageways that have one end attached to a cab and an opposite end that is retractable and can extend over the aircraft's wing root to access doors or hatches above the wing. The apparatus further includes horizontally-extendible ramps that couple passageways together and mate with the aircraft body, providing total protection of the aircraft's wing root. Along the length of an aircraft, the aerobridge provides simultaneous access to all doors (e.g., before the wing roots, over-the-wing roots, and aft the wing roots) for passengers embarking or disembarking the aircraft. The passageways are extendible using any suitable mechanism, for example telescopic extension and retraction, accordion-like extension and retraction, etc. In this way, the aerobridge provides horizontal adjustability based not only on the length of an aircraft but also positioning of particular entry and exit doorways.

In certain embodiments, the current aerobridge also provides vertical adjustability based on the heights of entry and exit doorways on a particular aircraft. Whereas many conventional PBBs are hindered by stationary support columns, the current aerobridge includes a retractable support system located at the distal end of the passageways. This support system deploys when the aerobridge is in service and retracts when the aerobridge has completed servicing the aircraft. Further, this support system is height adjustable depending on heights of the aircraft doorways.

In certain embodiments, the current aerobridge includes two spaced supports, including the retractable support system described previously. Having the two spaced supports provides a balance of weight distribution of the passageways. The first of these two supports is a drive column located in underlying relation to the largest, outermost passageway to support the weight of cab and the passageways. The second support is a retractable, fail-safe, support system located in underlying relation to the smallest, innermost passageway at its distal end. This support system can be deployed when the aerobridge is in its fully retracted position or when the aerobridge is in its fully extended position or any position therebetween (i.e., when the aerobridge is used to service doors located distal to the wing root), thus eliminating the risk of a bridge collapse that can result in a fire at the terminal gate.

With both horizontal and vertical adjustability, the current aerobridge offers a universally-applicable system that can be implemented on different aircrafts that having varying positions of doorways along their bodies. The aerobridge provides simultaneous access to multiple doors at several spaced locations along the side of the aircraft.

Optionally, certain embodiments of the instant aerobridge may include a plurality of proximity sensors disposed along the passageways and/or along the open side(s) of the passageways. These proximity sensors sense nearby structures and either provide notification to the operator or itself communicates to the aerobridge's control panel to maintain a safe distance from the nearby structures. This eliminates any chance of causing damage to the body of the aircraft, permits safe mating with the aircraft, and maintains a safe vertical distance between the aerobridge and the top of the wing of the aircraft.

Additionally, certain embodiments of the instant aerobridge may include one or more weight/load sensors, such as a load cell, positioned underneath the bridge/passageways to detect a weight or other downward force being placed on the aerobridge. If the weight or downward force exceeds a particular threshold, the sensor can transmit a signal to an operator or other authorized individual to notify him/her that there is excessive weight being placed on the bridge and additional precautions may need to take place to prevent the aerobridge or any corresponding passageways from collapsing. Alternatively or in addition, if the weight or downward force exceeds a particular threshold, the sensor can transmit a signal to the support system of the aerobridge such that the support system automatically reinforces its support mechanism to prevent collapse of the aerobridge.

This and other optional, suitable safety mechanisms are contemplated by the instant invention as well.

Using the disclosed structure, in certain instances, the current aerobridge is configured to be coupled with existing/currently installed PBBs, so that airports and airlines would not have to replace the existing PBB. Rather, the current aerobridge, specifically the passageways and ramps and support system, can be used as an add-on that is coupled to the cab of the existing PBB. In other instances, the current aerobridge exists as a full PBB with components that connect the terminal from the cab and components that extend over the wing of the plane.

Example

In an embodiment, shown in FIGS. 2A-2E, the current invention is an aerobridge, generally denoted by the reference numeral 10. Aerobridge 10 includes cab rotunda 12, cab 14, and an extendible bridge formed of a plurality of passageways. Cab rotunda 12 and cab 14 are configured to connect to an airport's existing equipment and jet bridge, leading to the airport's terminal gate, as indicated by the arrow in FIG. 2A.

The extendible bridge comprises first passageway 16 (proximal-most passageway), horizontally extendible ramp 18, second passageway 20, third passageway 22 (distal-most passageway), and distal housing 24. Aerobridge 10 further includes a support system, which comprises retractable end support 26 and drive support column 28. Housing 24 is configured to substantially enclose retractable end support 26.

Drive support column 28 includes a plurality of support mechanisms (wheels, support frame, support legs, cross supports, etc.), where a support frame may be vertically extendible/adjustable (see arrows in FIGS. 2C and 2E) based on height of the aircraft vehicle. The support frame may be extendible/adjustable in any suitable manner, for example hydraulically.

Aerobridge 10 can have outwardly facing wall 30 formed of any suitable material, such as steel or glass.

As noted previously, the bridge is extendible in any suitable manner, for example by telescopically-received passageways or by accordion-like extensions of passageways. Herein, for illustrative purposes, the mechanism of telescopic extension and retraction will be described. In this case, still referring to FIGS. 2A-2E, first passageway 16 telescopically receives horizontally extendible ramp 18; horizontally extendible ramp 18 telescopically receives second passageway 20; second passageway 20 telescopically receives third passageway 22; and housing 24 is disposed at the distal end of third passageway 22 and receives retractable end support 26 (see arrows in FIG. 2C) when the bridge is retracted into first passageway 16. Alternatively, ramp 18 itself can have walls formed of bellows, such that ramp 18 undergoes accordion-like extension and retraction, where passageways 16/20/22 still retain their telescopic assembly.

Generally, first passageway 16, second passageway 20, and third passageway 22 can each include an access point (not shown) into or out of the aircraft vehicle, such that passengers can enter or exit any of these access points. This access point can be an entirely open side along the extendible bridge, as can be seen by the broken lines in FIG. 2E, where the top and bottom sides of the bridge mate with the side of aircraft vehicle 11. As shown, when aerobridge 10 is in use, the open side of the bridge is closed off by the wall of aircraft vehicle 11 itself.

First passageway 16, horizontally extendible ramp 18, second passageway 20, and third passageway 22 are horizontally adjustable in order to line up with the doors provided on aircraft vehicle 11. Further, if, for example, aircraft vehicle 11 has only two (2) doors, third passageway 22 may remain retracted or telescopically received within second passageway 20 with the access points (i.e., open sides) of second passageway 20 and third passageway 22 aligned, so that passengers can continue to enter or exit aircraft vehicle 11 without hindrance.

Figure 2A:
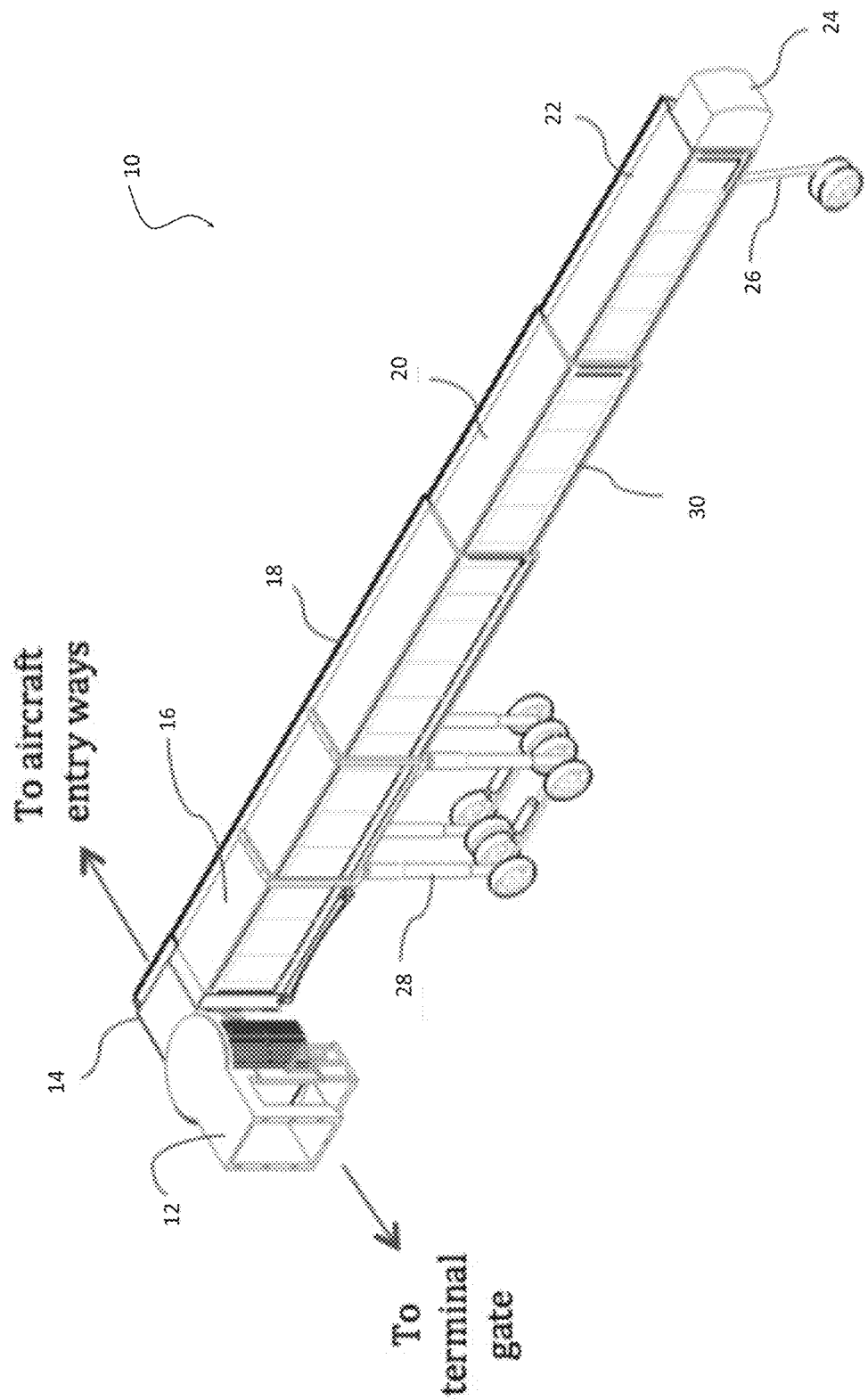
FIG. 2A is an isometric plan view of an embodiment of the current invention.
Figure 2B:
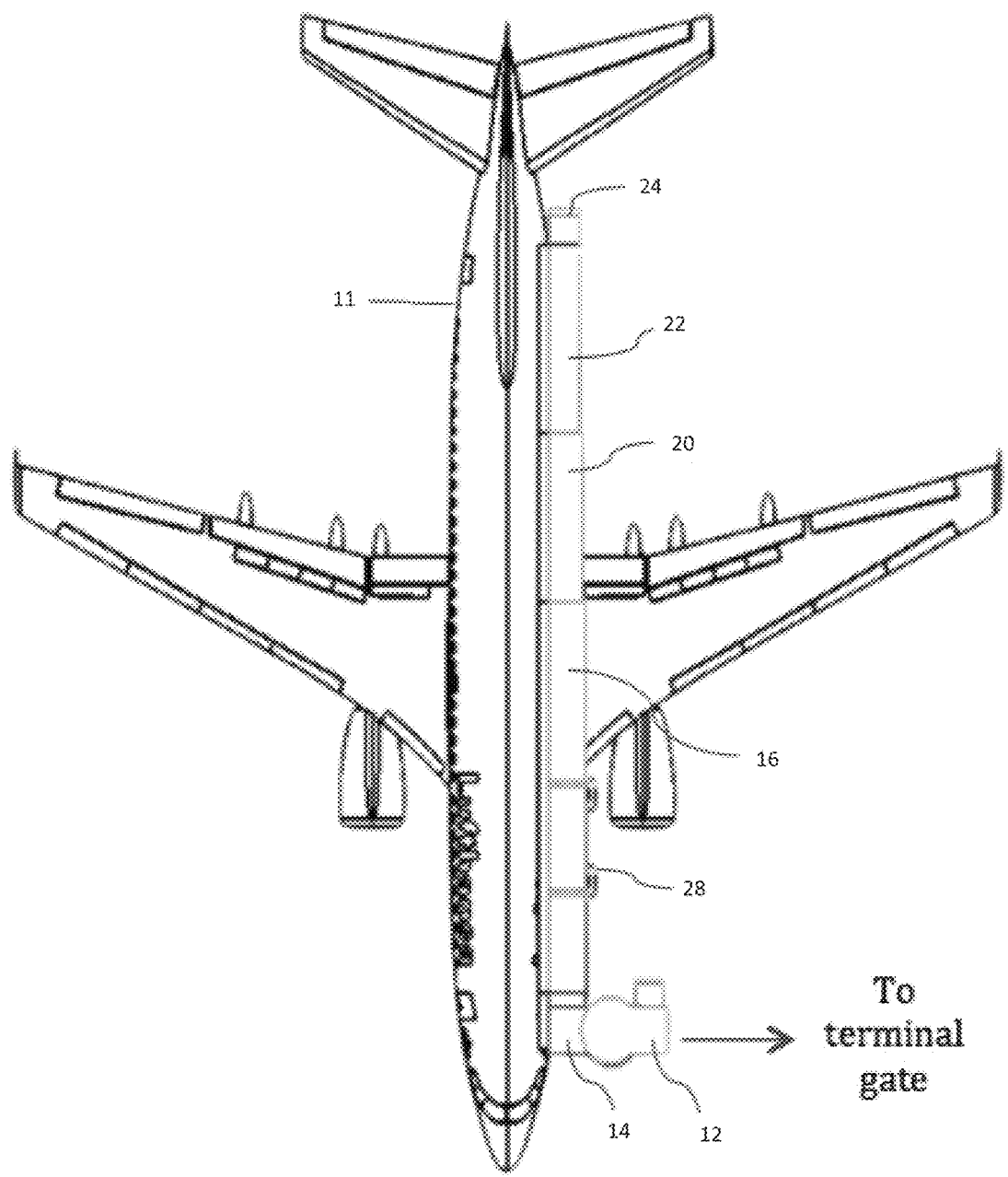
FIG. 2B is a top plan view of an embodiment of the current invention docked to an aircraft vehicle having multiple doors.
Figure 2C:
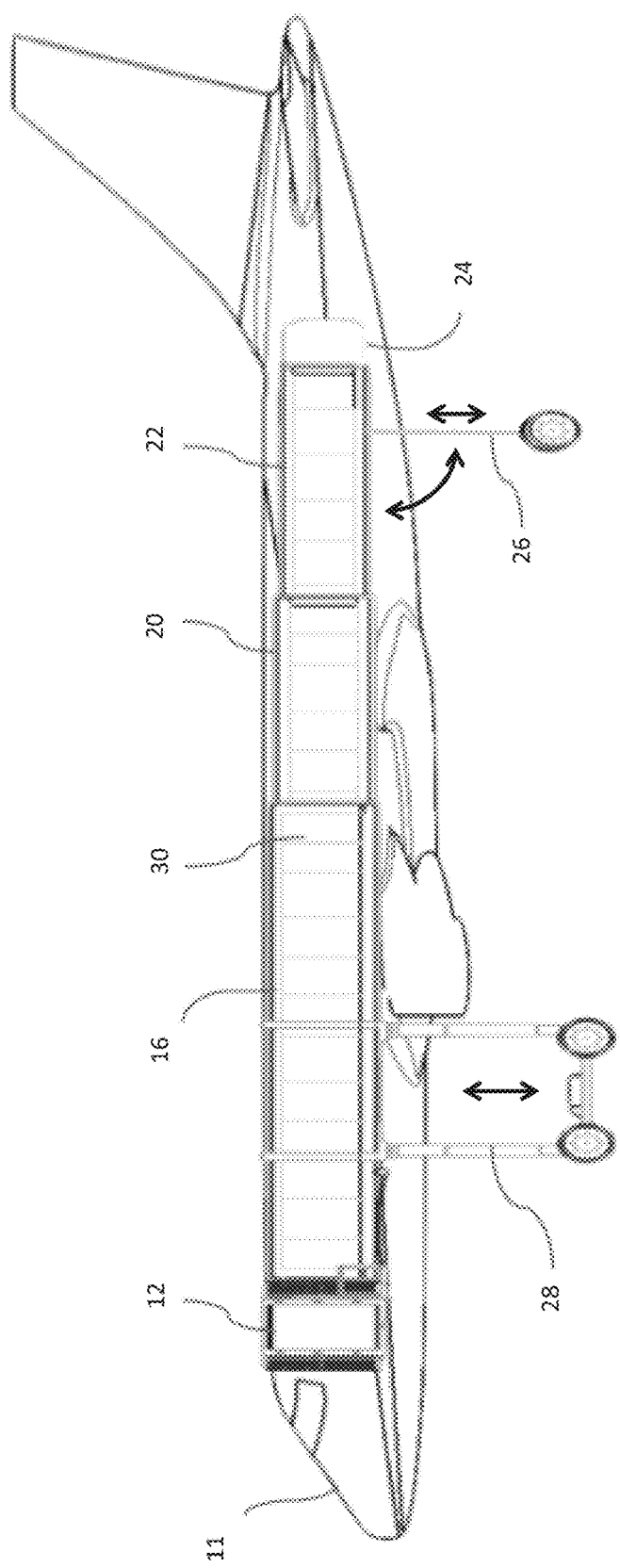
FIG. 2C is a front view of an embodiment of the current invention servicing an aircraft vehicle having multiple doors.
Figure 2D:
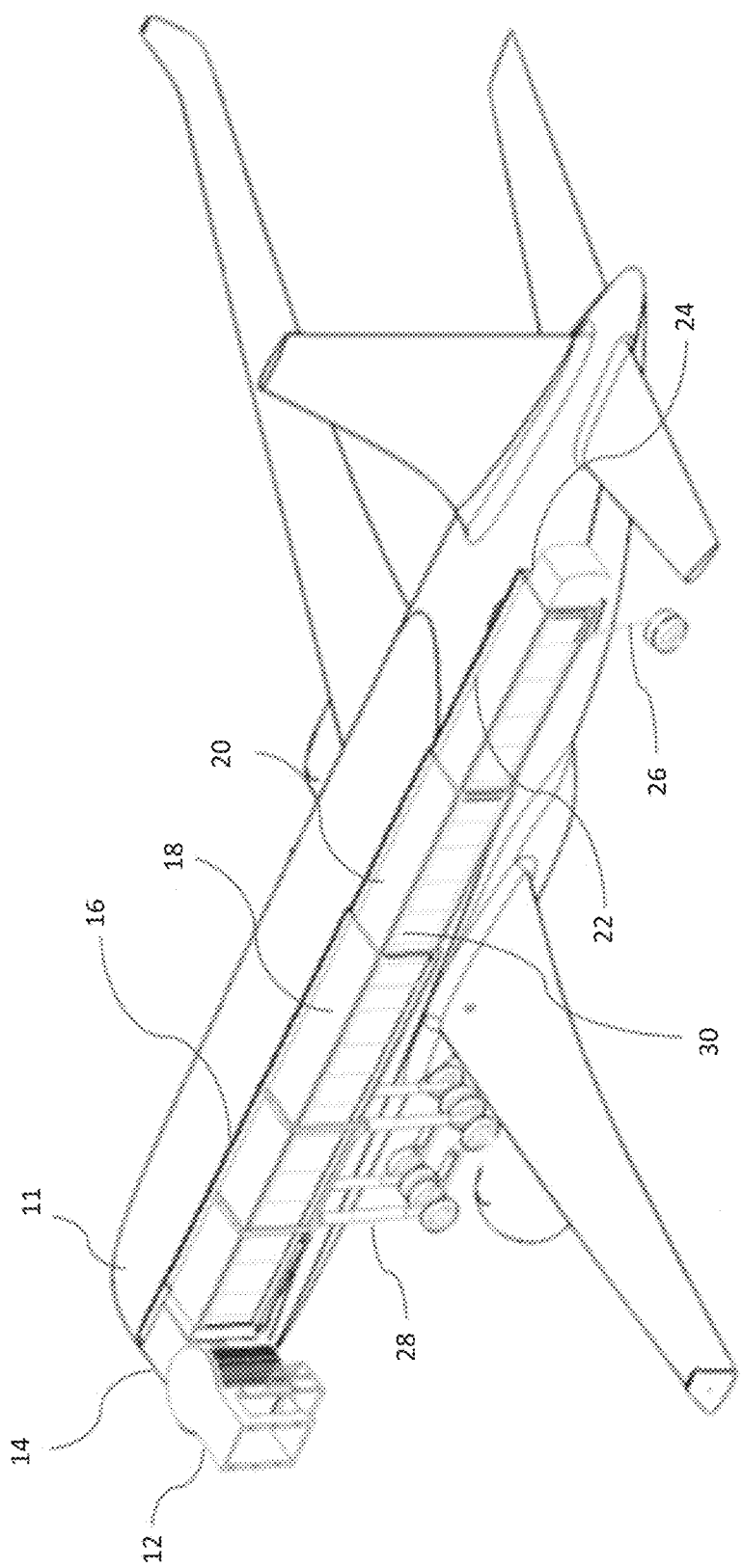
FIG. 2D is a perspective view of an embodiment of the current invention docked to an aircraft vehicle.
Figure 2E:
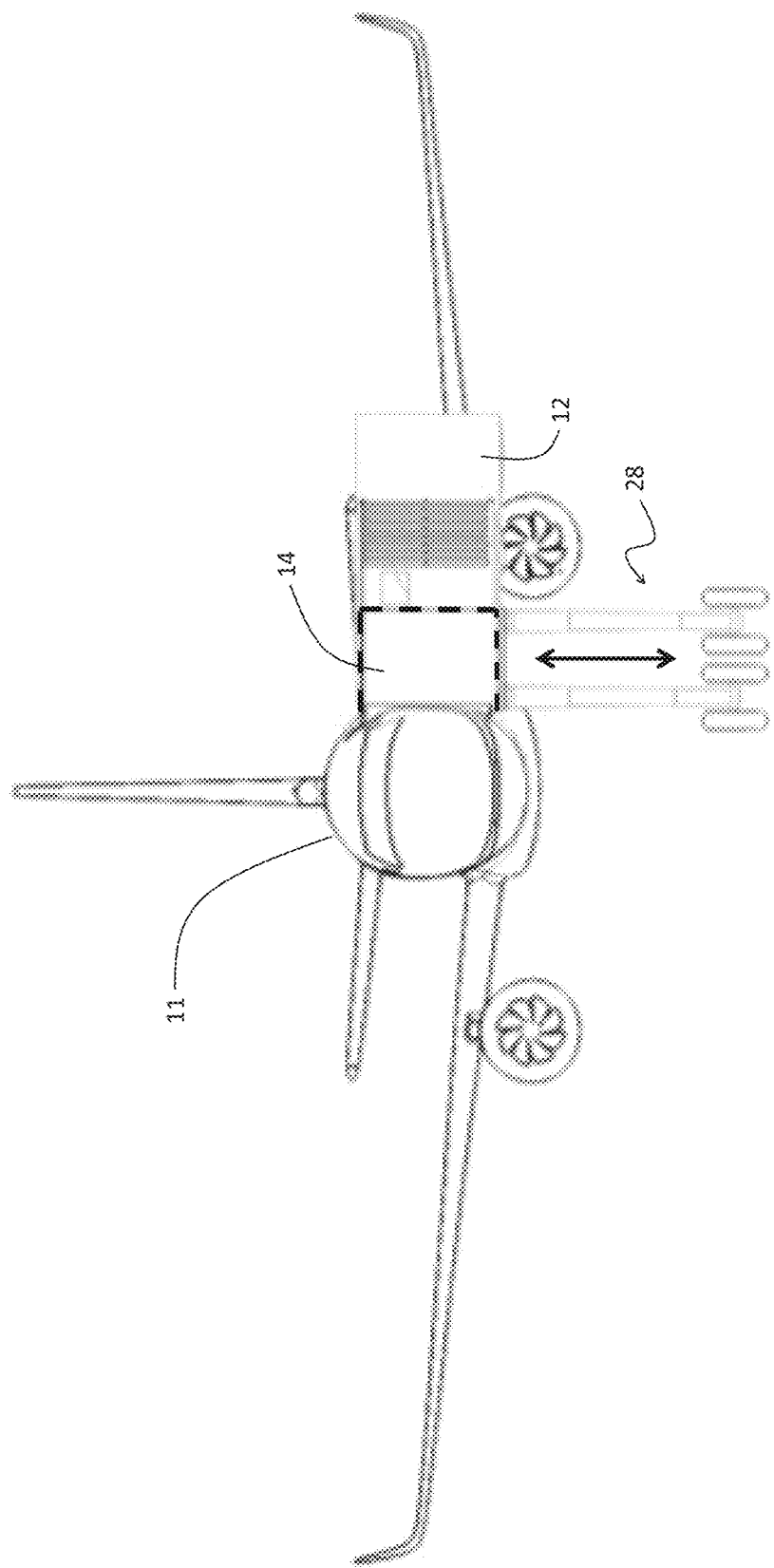
FIG. 2E is an end view of an embodiment of the current invention docked to an aircraft vehicle.

First passageway 16, horizontally extendible ramp 18, second passageway 20, and third passageway 22 can all be U-shaped, with the U-shape opening horizontally toward aircraft vehicle 11, as indicated by the broken lines in FIG. 2E. In this scenario, the top and bottom edges of the U-shape press against the sidewall of aircraft vehicle 11, such that when the bridge is extended along aircraft vehicle 11, the sidewall of aircraft vehicle 11 essentially becomes the inner wall of the bridge along first passageway 16, horizontally extendible ramp 18, second passageway 20, and third passageway 22. Here, the bridge can still be considered to include a plurality of access points, although the access points are in the form of an elongate opening of the U-shape, where passengers can still access the doors of aircraft vehicle 11.

As can be understood, aerobridge 10 has a fully retracted position, a fully extended position, and a plurality of positions therebetween depending on the length of bridge that is needed for aircraft vehicle 11. In the fully retracted position, ramp 18, second passageway 20, and third passageway 22 are retracted into (i.e., telescopically received by) first passageway 16. Further, in this fully retracted position, end support 26 is retracted into housing 24, and optionally, the support frame of drive support column 28 is vertically retracted in underlying relation to first passageway 16. It is contemplated herein that the support frame of drive support column 28 may also not be fully vertically retracted between uses, as most aircrafts may have heights that require a minimum level of extension of the support frame of drive support column 28. Maintaining a certain extension of the support frame of drive support column 28 may reduce the turnaround time of aircraft vehicle 11. Aerobridge 10 can be considered to be in its retracted position even if the support frame of drive support column 28 is not fully vertically retracted.

Similarly, an operator may wish to maintain a length of the bridge beyond full retraction into first passageway 16 if the aircrafts being serviced generally have similar door positions. This might also reduce turnaround time of aircraft vehicle 11, due to not having to extend the bridge from first passageway 16 every time. Aerobridge 10 can be considered to be in its retracted position even if ramp 18, second passageway 20, and/or third passageway 22 are not fully retracted into first passageway 16.

Aerobridge 10 also has a fully expanded position where ramp 18, second passageway 20, and third passageway 22 are expanded out of first passageway 16 along the length of aircraft vehicle 11. Additionally, end support 26 is expanded out of housing 24 and contacting the ground, and drive support column 28 is extended/elevated to the appropriate height. This fully expanded position can be seen in FIGS. 2A-2D.

As noted, aerobridge 10 also has a plurality of positions between the fully retracted position and the fully extended position depending on the length of the bridge needed. For example, if an operator requires aerobridge 10 to service two (2) doors that are located proximal to the wing root of aircraft vehicle 11, then the bridge can be extended as needed with the open sides aligned to provide access to the doors. However, because the doors are positioned proximal to the wing root of aircraft vehicle 11, it is likely that end support 26 does not need to be expanded out of housing 24 to contact the ground, as additional support for the bridge beyond drive support column 28 may not be required, since the bridge is not extended past the wing root of aircraft vehicle 11. Typically, when entry/exit doorways are located after the wing root, the bridge can extend beyond the wing root and additional support, specifically end support 26, is expanded to support the distal portions of the extended bridge.

It can be understood that horizontally extendible ramp 18 can be positioned anywhere along the bridge, for example between first passageway 16 and second passageway 20 (see FIG. 2A), on a proximal side of first passageway 16 (see FIG. 2D), between second passageway 20 and third passageway 22, among other configurations. The positioning of ramp 18 is determined by the type of aircraft vehicle 11 and disposition of its doors. In other words, ramp 18 can be positioned according to the needs of the operator.

Dual Method of Operation

Figure 3A:
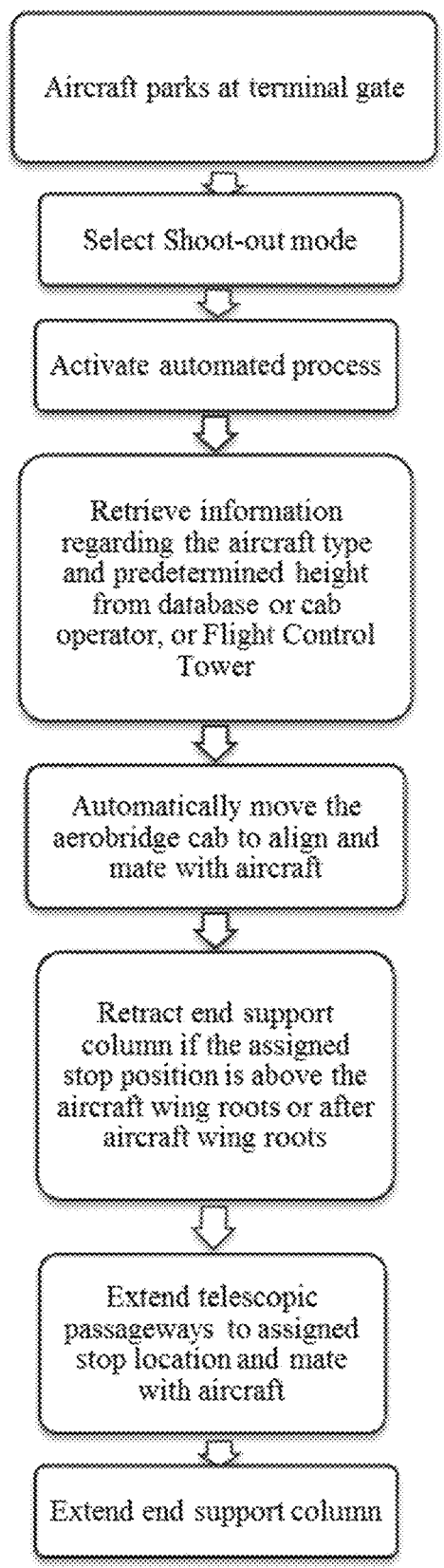
FIG. 3A is a flow chart depicting a shoot-out method for docking with an aircraft vehicle. In the shoot-out method of operation, the cab of certain embodiments of the current invention aligns and docks/mates with the aircraft vehicle before the cantilevered telescopic passageway extends to a predetermined length and mates with the aircraft vehicle.
Figure 3B:
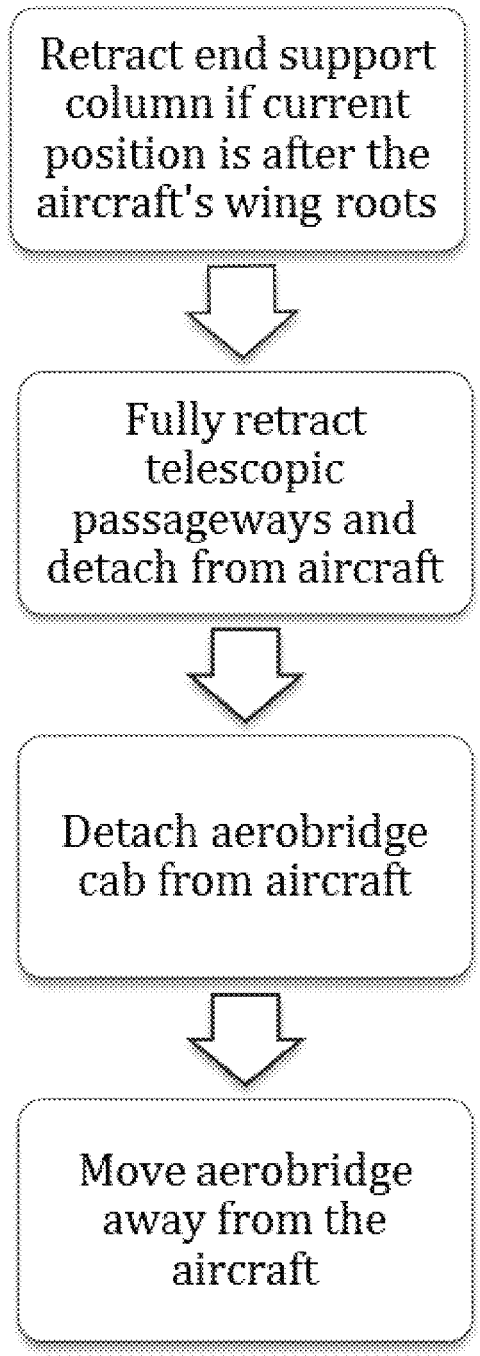
FIG. 3B is a flow chart depicting a shoot-out method for detaching from an aircraft vehicle.
Figure 4A:
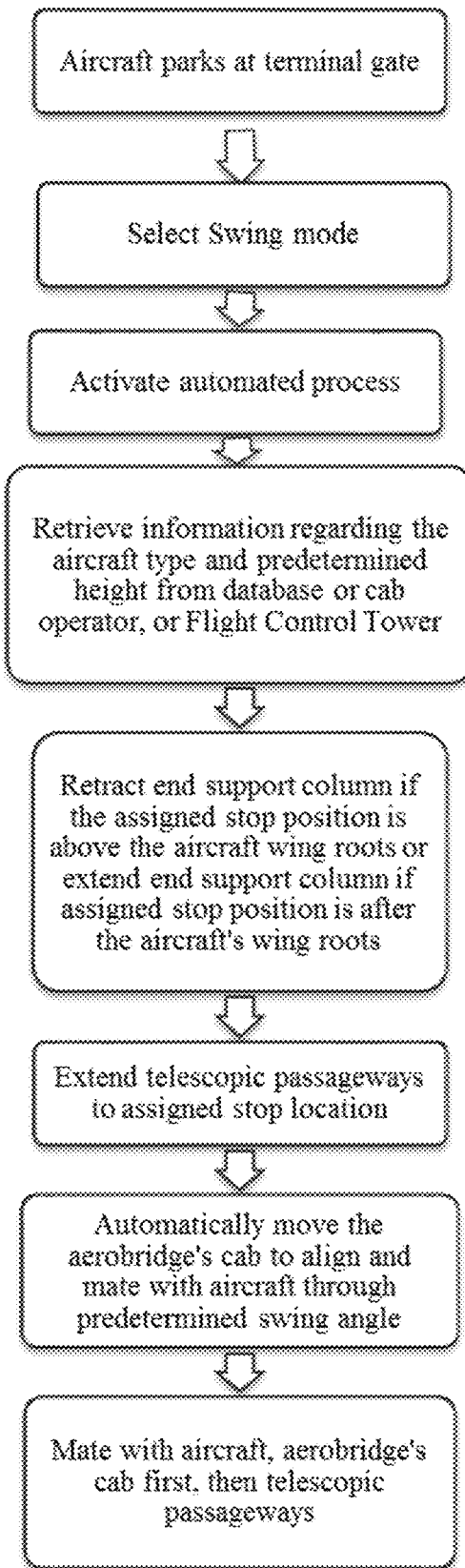
FIG. 4A is a flow chart depicting a swing method for docking with an aircraft vehicle. In the swing method of operation, the cantilevered telescopic passageway extends to a predetermined length, before traveling through a predetermined angle to align and mate with the aircraft vehicle.
Figure 4B:
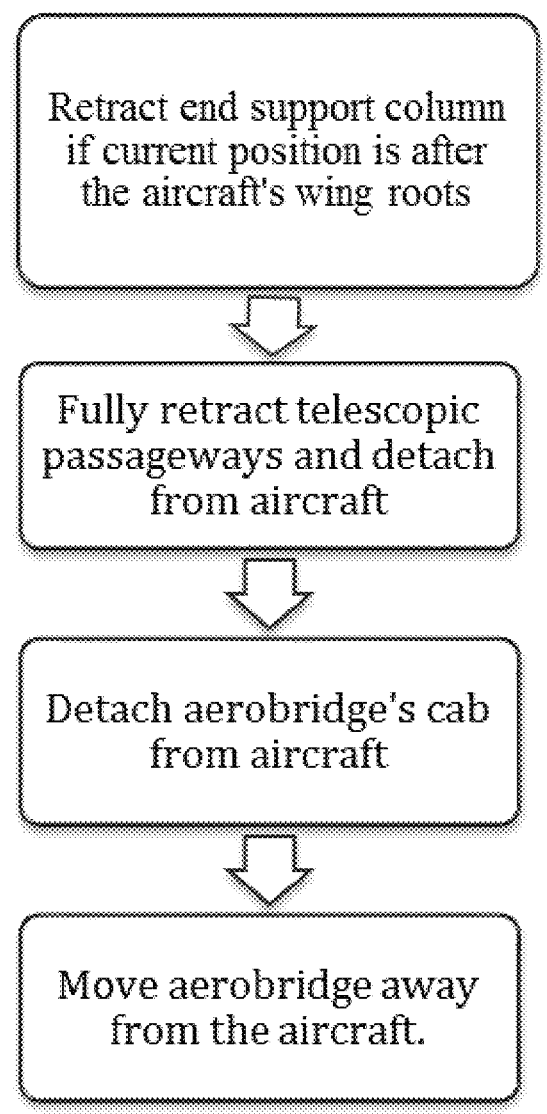
FIG. 4B is a flow chart depicting a swing method for detaching from an aircraft vehicle.

As discussed previously, there are two (2) primary methods of parking aircrafts at a terminal gate: nosed-in parking and parallel parking. Many, if not all, conventional PBBs are incapable of complying with both parking methods, whereas certain embodiments of the current invention are capable of being used during either parking method. The instant aerobridge is capable of docking/mating with an aircraft using one of two methods, namely the shoot-out method (FIGS. 3A-3B) or the swing method (FIGS. 4A-4B). The dual method of operation of the instant aerobridge is advantageous over conventional systems that mate with and detach from aircrafts using a single method, and its benefit can be demonstrated during application in airports or terminal gates where space is limited. In other words, certain embodiments of the current invention can be used to serve an aircraft parked either nosed-in or parallel at the terminal gate, which is particularly desirable for airports where ramp space is limited.

During extension in the shoot-out method (FIG. 3A), aircraft vehicle 11 parks at the terminal gate, where information is retrieved or automatically received pertaining the type, height, etc. of aircraft 11. Cab 14 of aerobridge 10 is moved and mated to aircraft vehicle 11. End support 26 can be retracted into or remain retracted in housing 24 if the distal stop position of the bridge is above the wing roots of aircraft vehicle 11 or is proximal to the wing roots of aircraft vehicle 11. Passageways 20, 22 (and optionally ramp 18) are extended telescopically to the distal stop location and mated with aircraft vehicle 11. End support 26 can then be extended out of housing 24 if needed, typically when the distal stop position of the bridge is distal to the wing roots of aircraft vehicle 11.

During retraction in the shoot-out method (FIG. 3B), end support 26 is retracted into housing 24 if its position is distal to the wing roots of aircraft vehicle 11. Passageways 20, 22 (and optionally ramp 18) are retracted telescopically and detached from aircraft vehicle 11. Cab 14 of aerobridge 10 can then be detached from aircraft vehicle 11, and aerobridge 10 can be moved away from aircraft vehicle 11.

In the case when aircraft vehicle 11 includes wingtips and is to be serviced, aerobridge 10 can utilize the shoot-out method to mate with vehicle 11, thus avoiding the vertical, upward height created by the wingtips.

During extension in the swing method (FIG. 4A), aircraft vehicle 11 parks at the terminal gate, where information is retrieved or automatically received pertaining type, height, etc. of aircraft vehicle 11. End support 26 can be retracted into or remain retracted in housing 24 if the distal stop position of the bridge is above the wing roots of aircraft vehicle 11 or is proximal to the wing roots of aircraft vehicle 11. Alternatively, end support 26 can be extended out of housing 24 if the distal stop position of the bridge is distal to the wing roots of aircraft vehicle 11. Passageways 20, 22 (and optionally ramp 18) are extended telescopically to align with the assigned distal stop position of aircraft vehicle 11 through the predetermined swing angle. Cab 14 of aerobridge 10 and passageways 20, 22, 22 (and optional ramp 18) move toward aircraft vehicle via the predetermined swing angle and then are mated to aircraft vehicle 11.

During retraction in the swing method (FIG. 4B), end support 26 is retracted into housing 24 if its position is distal to the wing roots of aircraft vehicle 11. Passageways 20, 22 (and optionally ramp 18) are detached from aircraft vehicle 11 and retracted telescopically. Cab 14 of aerobridge 10 can then be detached from aircraft vehicle 11, and aerobridge 10 can be moved away from aircraft vehicle 11.

It is contemplated herein that the current aerobridge can be operated manually or autonomously in any suitable manner. Generally, the automated ability of the instant aerobridge eliminates the need for additional bridge operators and gate control staff needed to operate multiple jetways, thereby increasing profitability, time efficiency and customer satisfaction. These two exemplary methods (shoot-out and swing methods) are typically present when the aerobridge is operated autonomously. For example, when aerobridge 10 is completely automated, when the characteristics of aircraft vehicle 11 are known/received and the shoot-out method or swing method is selected, aerobridge 10 is automatically activated and extends/retracts according to the methodology selected.

Glossary of Claim Terms

Distal stop position: This term is used herein to refer to a location or distance at which the distal end of the bridge should cease continued distal extension. This location/distance is based on the aircraft vehicle being serviced and in particular the positioning of its entry/exit doors.

Distal: This term is used herein to refer to a relative position further from the cab of the aerobridge or nose of the aircraft vehicle, and closer to the tail of the aircraft vehicle.

Open inner side: This term is used herein to refer to the opening in a sideways U-shaped structure. This opening is closed off by the wall of the aircraft vehicle when the bridge is mated to the aircraft vehicle.

Predetermined swing angle: This term is used herein to refer to the angle at which the aerobridge, including passageways, can move, relative to the length of the aircraft vehicle, in order to mate with the aircraft vehicle. This swing angle is based on the aircraft vehicle being serviced.

Proximal: This term is used herein to refer to a relative position closer to the cab of the aerobridge or nose of the aircraft vehicle.

Substantial entirety of the bridge: This term is used herein to refer to the open inner side of the bridge being formed along a length of the bridge, such that all of the doors of the aircraft vehicle are accessible through the open side. For example, all of the aircraft's doors may be accessible even though the open side being disposed along the entire length of the bridge.

Substantially parallel: This term is used herein to refer to two objects having longitudinal extents disposed in the same general direction. For example, a bridge can extend substantially parallel to the length of an aircraft vehicle, but not necessarily exactly parallel, as the bridge can extend and then swing slightly to mate with the aircraft vehicle.

Type, height, and characteristics of the aircraft vehicle: This term is used herein to refer to distinguishing features about a particular aircraft vehicle to be serviced by the current aerobridge. These distinguishing features should include information about the entry/exit doors of the aircraft vehicle.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An aerobridge that provides at least two entry/exit points into and out of an aircraft vehicle, comprising:
an extendible bridge having a proximal end and a distal end, said proximal end of said bridge coupled to a terminal gate the distal end being configured to engage a first doorway of said aircraft vehicle, a second extendible bridge formed of a plurality of passageways that have a length that is parallel to a length of said aircraft vehicle when said second extendible bridge is in use and at least partially extended;
at least one entry/exit point disposed within said plurality of passageways and aligned with at least a second door of on said aircraft vehicle, such that passengers enter or exit said aircraft vehicle through said first and second doorways and said entry/exit points; and
a support system positioned in underlying relation to said second extendible bridge for supporting said second extendible bridge along said length of said second extendible bridge,
wherein said second extendible bridge has a retracted position, an extended position, and a plurality of stable positions between said retracted position and said extended position, wherein
in said retracted position, said plurality of passageways of said second extendible bridge is fully retracted into or adjacent to a proximal-most passageway of said bridge,
in said extended position, said plurality of passageways of said extendible bridge is fully extended distally along said length of said aircraft vehicle and over a wing root of said aircraft vehicle,
in said plurality of stable positions between said retracted position and said extended position, said plurality of passageways of said second extendible bridge is partially extended distally along said length of said aircraft vehicle.

2. An aerobridge as in claim 1, wherein said second extendible bridge is extendible and retractable via said plurality of passageways extending telescopically out of said proximal-most passageway and retracting telescopically into sad proximal-most passageway.

3. An aerobridge as in claim 1, wherein said plurality of entry/exit points is formed of an open inner side along a substantial entirety of said length of said second extendible bridge, such that a top side of said second extendible bridge is mated to said aircraft vehicle above said doors of said aircraft vehicle, and such that a bottom side of said second extendible bridge is also mated to said aircraft vehicle.

4. An aerobridge as in claim 1, wherein said cab assembly is formed of a cab and a cab rotunda coupled together with said proximal end of said second extendible bridge coupled to said cab.

5. An aerobridge as in claim 1, wherein said support system includes a proximal drive support column that is disposed in underlying relation to a proximal portion of said second extendible bridge at a position proximal to said wing root of said aircraft vehicle, wherein said proximal drive support column is vertically adjustable.

6. An aerobridge as in claim 5, wherein said support system further includes a retractable distal end support disposed in underlying relation to a distal portion of said bridge at second extendible a position distal to said wing root of said aircraft vehicle, wherein said retractable distal end support is vertically retractable into or along said second extendible bridge.

7. An aerobridge as in claim 6, further comprising an end support column housing disposed at said distal end of said second extendible bridge, wherein said distal end support is retractable into said end support column housing and extendible to contact a ground on which said aircraft vehicle is positioned.

8. An aerobridge as in claim 1, wherein said support system includes a retractable distal end support disposed in underlying relation to a distal portion of said second extendible bridge at a position distal to said wing root of said aircraft vehicle, wherein said retractable distal end support is vertically retractable into or along said second extendible bridge.

9. An aerobridge as in claim 8, further comprising an end support column housing disposed at said distal end of said second extendible bridge, wherein said distal end support is retractable into said end support column housing and extendible to contact a ground on which said aircraft vehicle is positioned.

10. An aerobridge as in claim 8, wherein said support system further includes a proximal drive support column that is disposed in underlying relation to a proximal portion of said second extendible bridge at a position proximal to said wing root of said aircraft vehicle, wherein said proximal drive support column is vertically adjustable depending on a height of said first and second doorways of said aircraft vehicle.

11. An aerobridge as in claim 1, wherein said second extendible bridge further includes an extendible ramp disposed anywhere along said length of said second extendible bridge to provide extensions beyond said plurality of passageways.

12. An aerobridge as in claim 11, wherein said extendible ramp is positioned over said wing root of said aircraft vehicle between passageways.

13. An aerobridge as in claim 12, wherein said plurality of passageways includes a first passageway being said proximal-most passageway, a second passageway, and a third passageway being a distal-most passageway, wherein said extendible ramp is disposed between said first passageway and said second passageway.

14. A method of mating and detaching an aerobridge to and from an aircraft vehicle, comprising:
retrieving information pertaining to type, height, and characteristics of said aircraft vehicle that is parked at a terminal gate,
wherein said aerobridge includes a cab assembly, an extendible bridge formed of a plurality of passageways that are extendible and retractable, and a support system disposed in underlying relation to said bridge for supporting said bridge along a length of said bridge,
wherein said support system includes a proximal drive support column that is vertically adjustable and a retractable distal end support that is retractable into or along said bridge;
moving said cab assembly of said aerobridge to align and mate with a proximal door of said aircraft vehicle;
extending said plurality of passageways substantially parallel to a longitudinal extent of said aircraft vehicle, said plurality of passageways extended to a distal stop position of said bridge along said aircraft vehicle;
extending said distal end support if said distal stop position of said bridge is determined to be positioned distal to a wing root of said aircraft vehicle, wherein the determination is based on the step of retrieving information about said aircraft vehicle,
wherein said distal end support remains retracted if said distal stop position of said bridge is determined to be positioned above said wing root of said aircraft vehicle or proximal to said wing root of said aircraft vehicle; and
mating said passageways to said aircraft vehicle to provide multiple access points through multiple doors on said aircraft vehicle.

15. A method as in claim 14, wherein said multiple access points are formed of an open inner side along a substantial entirety of said length of said bridge, such that a top side of said bridge is mated to said aircraft vehicle above said doors of said aircraft vehicle, and such that a bottom side of said bridge is also mated to said aircraft vehicle.

16. A method as in claim 14, wherein said extendible bridge is extendible and retractable via said plurality of passageways extending telescopically out of said proximal-most passageway and retracting telescopically into sad proximal-most passageway.

17. A method as in claim 14, wherein said aerobridge is detached from said aircraft vehicle by:
retracting said distal end support;
detaching said plurality of passageways and said cab assembly from said aircraft vehicle;
retracting said plurality of passageways into a proximal-most passageway of said extendible bridge; and
moving said aerobridge away from said aircraft vehicle.

18. A method of mating and detaching an aerobridge to and from an aircraft vehicle, comprising:
retrieving information pertaining to type, height, and characteristics of said aircraft vehicle that is parked at a terminal gate,
wherein said aerobridge includes a cab assembly, an extendible bridge formed of a plurality of passageways that are extendible and retractable, and a support system disposed in underlying relation to said bridge for supporting said bridge along a length of said bridge;
extending said plurality of passageways to a length aligned with a distal stop position of said bridge along said aircraft vehicle;
extending said distal end support if said distal stop position of said bridge is determined to be positioned distal to a wing root of said aircraft vehicle, wherein the determination is based on the step of retrieving information about said aircraft vehicle,
wherein said distal end support remains retracted if said distal stop position of said bridge is determined to be positioned above said wing root of said aircraft vehicle or proximal to said wing root of said aircraft vehicle;
swinging said extended plurality of passageways toward said aircraft vehicle at a predetermined swing angle;
moving and mating said cab assembly of said aerobridge to align with a front door of said aircraft vehicle using said predetermined swing angle; and
mating said plurality passageways to said aircraft vehicle via said predetermined swing angle to provide multiple access points through multiple doors on said aircraft vehicle.

19. A method as in claim 18, wherein said multiple access points are formed of an open inner side along a substantial entirety of said length of said bridge, such that a top side of said bridge is mated to said aircraft vehicle above said doors of said aircraft vehicle, and such that a bottom side of said bridge is also mated to said aircraft vehicle.

20. A method as in claim 18, wherein said extendible bridge is extendible and retractable via said plurality of passageways extending telescopically out of said proximal-most passageway and retracting telescopically into sad proximal-most passageway.

21. A method as in claim 18, wherein said aerobridge is detached from said aircraft vehicle by:
retracting said distal end support;
detaching said plurality of passageways and said cab assembly from said aircraft vehicle;
retracting said plurality of passageways into a proximal-most passageway of said extendible bridge; and
moving said aerobridge away from said aircraft vehicle.

\* \* \* \* \*